US012273635B2

(12) United States Patent
Bock et al.

(10) Patent No.: US 12,273,635 B2
(45) Date of Patent: Apr. 8, 2025

(54) SENSOR DATA ENCODING WITH SYNCHRONOUS READOUT

(71) Applicant: APPLE INC., Cupertino, CA (US)

(72) Inventors: Nikolai E. Bock, San Jose, CA (US); Emanuele Mandelli, Mountain View, CA (US); Gennady A. Manokhin, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 7 days.

(21) Appl. No.: 17/774,727

(22) PCT Filed: Nov. 5, 2020

(86) PCT No.: PCT/US2020/059003
§ 371 (c)(1),
(2) Date: May 5, 2022

(87) PCT Pub. No.: WO2021/096744
PCT Pub. Date: May 20, 2021

(65) Prior Publication Data
US 2022/0394196 A1  Dec. 8, 2022

Related U.S. Application Data

(60) Provisional application No. 62/934,259, filed on Nov. 12, 2019, provisional application No. 62/986,843, filed on Mar. 9, 2020.

(51) Int. Cl.
H04N 25/50       (2023.01)
H04N 25/75       (2023.01)

(52) U.S. Cl.
CPC ............ H04N 25/50 (2023.01); H04N 25/75 (2023.01)

(58) Field of Classification Search
CPC ..................................................... H04N 25/50
See application file for complete search history.

(56) References Cited

U.S. PATENT DOCUMENTS 8,421,015 B1 * 4/2013 Scott ...................... G01S 3/781
                                                    250/338.4
9,001,251 B2   4/2015 Smith et al.
(Continued)

FOREIGN PATENT DOCUMENTS

CN     102282839 A    12/2011
CN     103297715 A     9/2013
(Continued)

OTHER PUBLICATIONS

European Patent Office (ISA/EP), International Search Report and Written Opinion of the International Searching Authority, International Application No. PCT/US2020/059003, 13 pages, Feb. 23, 2021.

(Continued)

Primary Examiner — Cynthia Segura
(74) Attorney, Agent, or Firm — Thompson Hine LLP

(57) ABSTRACT

Various implementations disclosed herein include devices, systems, and methods that determine a control signal before synchronous readout of a frame (or part of the frame) is performed by a sensor. Various implementations disclosed herein include devices, systems, and methods that determine event density (e.g., a dense row signal or a dense frame signal) before synchronous readout is performed by the sensor. In some implementations, the event camera is capable of operating in a first readout mode and a second readout mode based on a number of events. In the second readout mode, less data per pixel may be readout.

19 Claims, 10 Drawing Sheets

(56) References Cited

U.S. PATENT DOCUMENTS

| | | | |
|---|---|---|---|
| 9,277,113 B2* | 3/2016 | Ikedo | H01L 27/14627 |
| 9,934,557 B2 | 4/2018 | Ji et al. | |
| 10,136,090 B2 | 11/2018 | Vogelsang et al. | |
| 10,419,701 B2 | 9/2019 | Liu | |
| 10,567,679 B2 | 2/2020 | Berner et al. | |
| 11,678,074 B2* | 6/2023 | Naganuma | H04N 25/50 |
| | | | 348/220.1 |
| 2010/0283881 A1 | 11/2010 | Araki | |
| 2012/0019698 A1 | 1/2012 | Ui | |
| 2012/0257789 A1 | 10/2012 | Lee et al. | |
| 2016/0203610 A1 | 7/2016 | Lee et al. | |
| 2016/0309105 A1 | 10/2016 | Dierickx et al. | |
| 2017/0059399 A1 | 3/2017 | Suh | |
| 2017/0126991 A1 | 5/2017 | Singh | |
| 2018/0167575 A1 | 6/2018 | Watanabe et al. | |
| 2019/0075271 A1 | 3/2019 | Orfaig et al. | |
| 2019/0289230 A1 | 9/2019 | Berner | |
| 2019/0364230 A1 | 11/2019 | Yeo et al. | |
| 2019/0364237 A1* | 11/2019 | Yeo | H04N 25/76 |
| 2020/0029031 A1* | 1/2020 | Kubendran | H04N 25/50 |
| 2020/0372254 A1* | 11/2020 | Laveau | G06V 20/20 |
| 2021/0029298 A1 | 1/2021 | Mysore | |
| 2022/0006965 A1 | 1/2022 | Zhu | |
| 2023/0008550 A1* | 1/2023 | Bock | H04N 25/771 |
| 2023/0276141 A1* | 8/2023 | Kodama | H04N 25/78 |
| | | | 348/307 |
| 2023/0328406 A1* | 10/2023 | Berner | H04N 25/766 |
| | | | 348/300 |
| 2024/0365025 A1* | 10/2024 | Hairston | H04N 25/47 |

FOREIGN PATENT DOCUMENTS

| | | |
|---|---|---|
| CN | 106488151 A | 3/2017 |
| EP | 3506622 A1 | 7/2019 |
| JP | S59124159 A | 7/1984 |
| KR | 1020190027716 A | 3/2019 |
| KR | 1020190102223 A | 9/2019 |
| WO | 2019/135411 A1 | 7/2019 |

OTHER PUBLICATIONS

European Patent Office (ISA/EP), International Search Report and Written Opinion of the International Searching Authority, International Application No. PCT/US2020/059772, 12 pages, Feb. 23, 2021.

China National Intellectual Property Administration, Notification of First Office Action (with English translation), Chinese Patent Application No. 202080078090.X, 19 pages, Mar. 30, 2024.

Korean Intellectual Property Office, Notice of Preliminary Rejection (with English translation), Korean Patent Application No. 10-2022-7016050, 17 pages, Apr. 29, 2024.

United States Patent and Trademark Office, Non-Final Office Action, U.S. Appl. No. 17/774,878, 13 pages, May 15, 2024.

China National Intellectual Property Administration, Notification of the First Office Action (with English translation), Chinese Patent Application No. 202080078404.6, 13 pages, Jul. 5, 2024.

* cited by examiner

SENSOR DATA ENCODING WITH SYNCHRONOUS READOUT

TECHNICAL FIELD

The present disclosure generally relates to systems, methods, and devices that use sensors, for example, in high data rate circumstances.

BACKGROUND

In various circumstances, sensors can be overloaded with data. Accordingly, there is a need for improved sensor input/output methods and systems.

SUMMARY

Various implementations disclosed herein include devices, systems, and methods that determine a control signal before synchronous readout of a frame (or part of the frame) is performed by a sensor. Various implementations disclosed herein include devices, systems, and methods that determine a dense row signal or a dense frame signal before synchronous readout is performed by the sensor. In some implementations, the sensor using a synchronous readout may select a readout mode for that frame (or part of a frame) based on how many of the pixels are detecting events. For example, a first mode that reads out only data for pixels that have events may be selected when less than a threshold percentage (e.g., 20%) of the pixels are detecting events, while a second mode that reads out data for every pixel may be selected when more than the threshold percentage of pixels are detecting events. In the second mode, less data per pixel may be readout. In some implementations, the flexible event encoding/readout may be more efficient, reduce power, improve image quality, or avoid overloading a readout circuit of the sensor. The density determination (e.g., dense row or dense frame) is made using analog or digital circuits.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
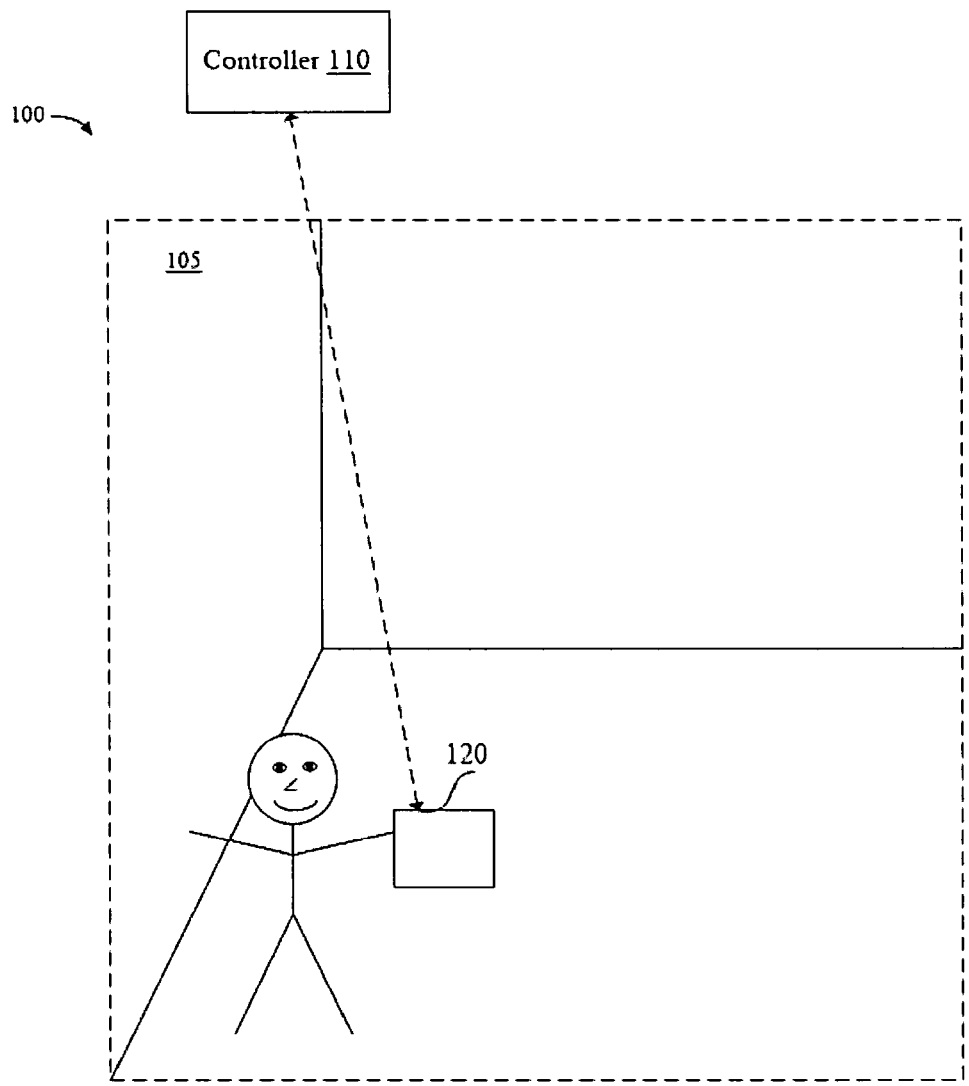
FIG. 1 is a block diagram of an example system in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Various implementations disclosed herein include devices, systems, and methods that detect event density before synchronous readout of a frame (or part of the frame) is performed by an event camera. In some implementations, a system includes a matrix arrangement of a plurality of rows of pixels, where each of the pixels includes a photodetector and an event detector coupled to the photodetector. The event detector is configured to detect an event based on detecting a change in light intensity exceeding a change threshold in light received at the photodetector. In some implementations, an event density detector is configured to determine event density of events detected at a subset of pixels of the matrix arrangement based on inputs received from the subset of pixels and a density threshold. Then, a readout circuit is configured to determine a readout mode based on the event density detector and to readout event data based on the readout mode.

Various implementations disclosed herein include devices, systems, and methods that temporarily store sparse event data before transmission to an output link and directly transmit dense event data to the output link during readout of a frame (or part of the frame) is performed by an event camera. In some implementations, a system includes a matrix arrangement of pixels, where each of the pixels is configured to detect an event based on detecting a change in light intensity exceeding a threshold in light received at a photodetector. In some implementations, an event buffer is configured to accumulate event data from the pixels at the matrix arrangement for events occurring based on accumulation criteria, and a transmission circuit is configured to readout event data from the event buffer and transmit the event data. In some implementations, the transmission circuit includes a communication link that is disabled between transmissions. In some implementations, the transmission circuit may readout or send event data based on how full the event buffer is from accumulated event data. In some implementations, the transmission circuit bypasses the event buffer based on events occurring at the matrix arrangement of pixels satisfying event density criteria.

FIG. 1 is a block diagram of an example operating environment 100 in accordance with some implementations. As a non-limiting example, the operating environment 100 includes a controller 110 and an electronic device (e.g., a laptop) 120, one or all of which may be in a physical setting 105.

In some implementations, the controller 110 may be configured to detect intensity and contrast change. In some implementations, the controller 110 includes a suitable combination of software, firmware, or hardware. The controller 110 is described in greater detail below with respect to FIG. 2. In some implementations, the controller 110 is a computing device that is local or remote relative to the physical setting 105.

In one example, the controller 110 is a local server located within the physical setting 105. In another example, the controller 110 is a remote server located outside of the physical environment 105 (e.g., a cloud server, central server, etc.). In some implementations, the controller 110 is communicatively coupled with a corresponding electronic device 120 via one or more wired or wireless communication channels 144 (e.g., BLUETOOTH, IEEE 802.11x, IEEE 802.16x, IEEE 802.3x, etc.).

In some implementations, the controller 110 and a corresponding electronic device (e.g., 120) are configured to detect intensity and contrast change together.

In some implementations, the electronic device 120 is configured to detect intensity and contrast change. In some implementations, the electronic device 120 includes a suitable combination of software, firmware, or hardware. The electronic device 120 is described in greater detail below with respect to FIG. 3. In some implementations, the functionalities of the corresponding controller 110 is provided by or combined with the electronic device 120, for example, in the case of an electronic device that functions as a standalone unit.

Figure 2:
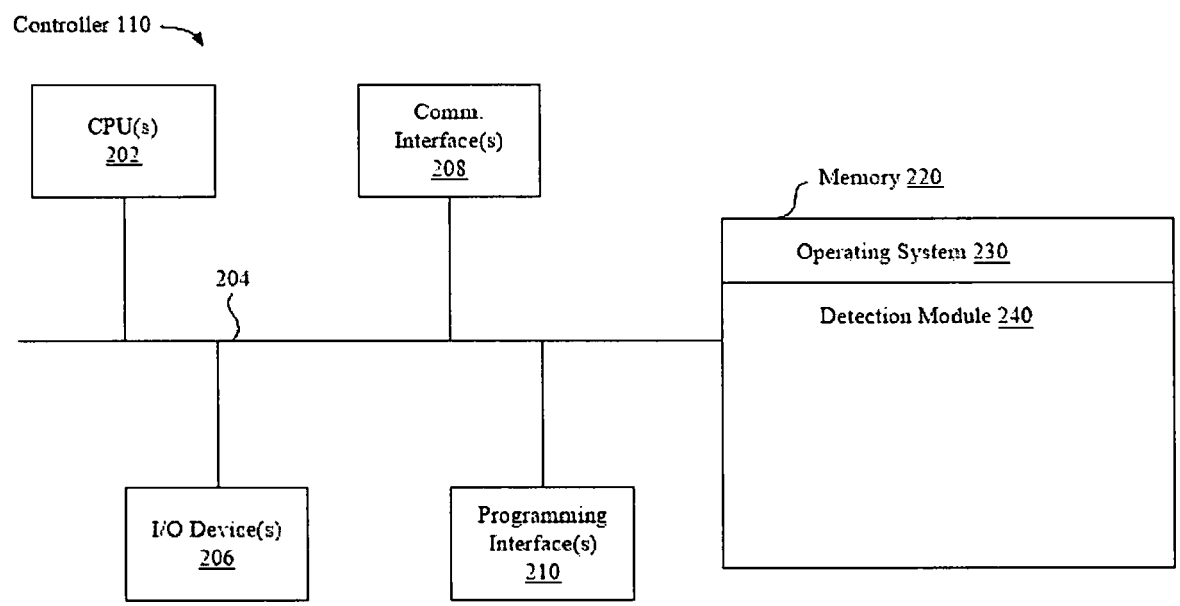
FIG. 2 is a block diagram of an example controller, in accordance with some implementations.

FIG. 2 is a block diagram of an example of a controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image capture devices or other sensors, one or more displays, or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and detection module 240.

The operating system 230 includes procedures for handling various basic system services and for performing hardware dependent tasks. In some implementations, the detection module 240 is configured to detect contrast change, for example, using an EVENT CAMERA. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 3:
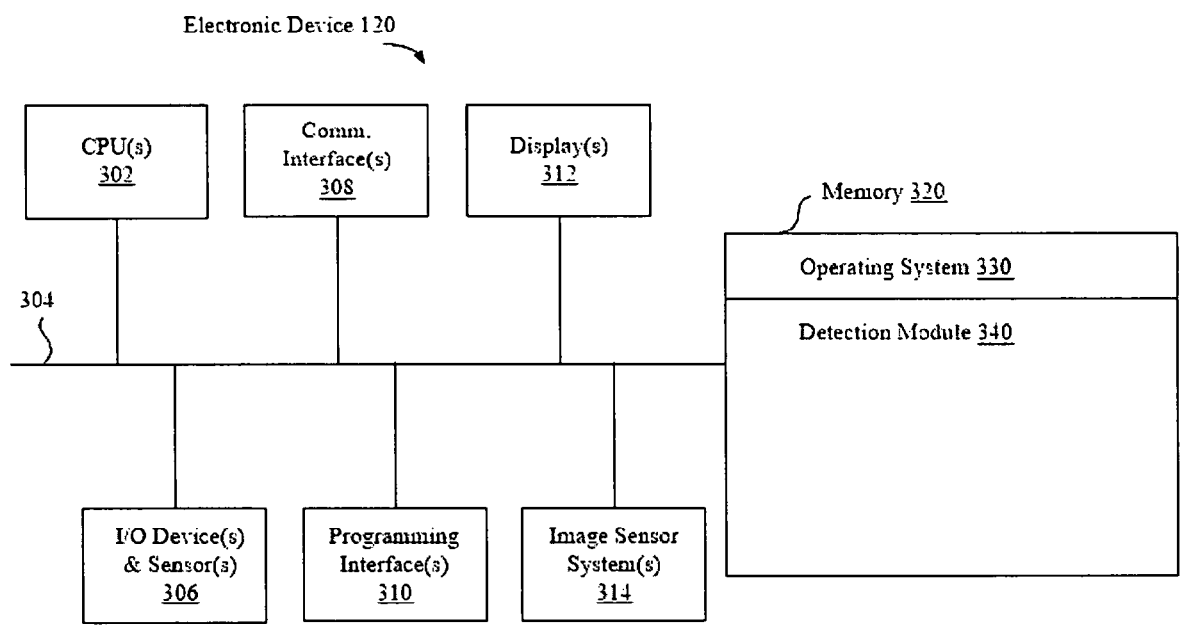
FIG. 3 is a block diagram of an example electronic device, in accordance with some implementations.

FIG. 3 is a block diagram of an example of an electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present content to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 312 correspond to diffractive, reflective, polarized, holographic, etc. waveguide displays. For example, the electronic device may include a single display. In another example, the electronic device may include a display for each eye of the user.

In some implementations, the one or more interior or exterior facing image sensor systems 314 include an image capture device or array (e.g., a frame camera or an event camera) that captures image data or an audio capture device or array (e.g., microphone) captures audio data.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a detection module 340.

The operating system 330 includes procedures for handling various basic system services and for performing hardware dependent tasks. In some implementations, the detection module 340 is configured to detect contrast change, for example, using an event camera. Moreover, FIG. 3 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Event cameras generate events in response to temporal contrast changes in a physical setting. Generally, an event camera readout is asynchronous, which means each pixel can generate an event whenever a contrast change is detected in that particular pixel, and provides fast event-driven response. In the asynchronous event camera readout, asynchronous events encoding includes x and y coordinates and a time stamp. Usually events are sparse, and therefore an asynchronous output data rate of the event camera is very low when compared to frame-based image sensors. In this case of sparse events, asynchronous encoding doesn't require high bandwidth readout of the event camera. However, asynchronous event camera readout can be overloaded when numerous events are generated.

In the asynchronous event camera readout, a typical pixel packet for event camera may include a polarity bit (e.g., positive or negative contrast change), X and Y pixel coordinates, and a time stamp. In some implementations, the time stamp can be 16 bits. In some implementations, X and Y pixel coordinates can be 9/10 bits (e.g., for a Video Graphics Array (VGA) sensor). However sudden background light intensity changes or fast moving scenes may cause a significant number of pixels to trigger, with the potential of overloading the asynchronous event camera readout pipeline.

Various implementations disclosed herein include devices, systems, and methods implemented by an electronic device using synchronous readout for an event camera. Various implementations disclosed herein include devices, systems, and methods implemented by an electronic device that detect a number of events (e.g., sparse or dense) in the event camera. Various implementations disclosed herein include devices, systems, and methods that change synchronous frame readout (or part of a frame) based on the detected number of events (e.g., dense row signal or dense frame signal) in the event camera. In some implementations, a dense row signal or a dense frame signal is generated before synchronous readout of the frame (or part of the frame) is performed by the event camera. In some implementations, the event camera operates in the first readout mode or a second readout mode based on a dense/sparse control signal (e.g., row or frame) generated by the pixel array before readout from the pixel array.

In various implementations, the event camera includes a plurality of pixels (e.g., a matrix of pixels) that are capable of detecting events (e.g., contrast change).

In some implementations, the event camera can be readout in a synchronous raster mode, which is similar to a traditional rolling shutter camera, where each row is scanned sequentially once per frame. In some implementations in the synchronous mode, the time stamp can be transmitted once per frame as a frame header, a row number can be encoded as a read row header, and the pixel encoding can include polarity and X coordinate (e.g., 1 bit+10 bits=11 bits). Only pixels that have events transmitted in this case.

In some implementations, the event camera can be readout in synchronous raw raster mode, where each pixel is encoded with 2 bits (e.g., positive event, negative event, or no event).

In some implementations, the synchronous readout mode, and the synchronous raw raster readout mode can be used to readout a portion of the event camera. Thus, the readout modes can be used for each row, each frame, or any subset of the pixel array in the event camera.

In some implementations, various known techniques can be used to compress the data in the event camera readout modes (e.g., the 11 bit packets, or the 2 bit packets). Further, in some implementations, the bits sizes of the packets in the readout modes can be varied.

Figure 4:
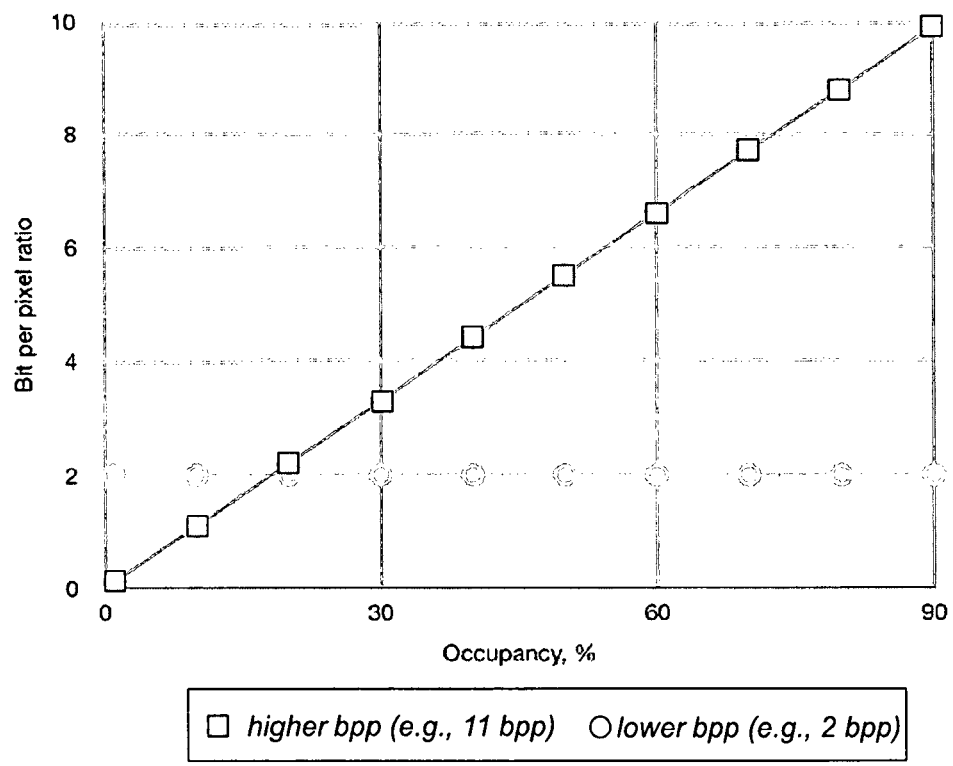
FIG. 4 is a diagram showing an example relationship between event camera bits per pixel encoding and a number of events per frame in accordance with some implementations.

FIG. 4 is a diagram showing an example relationship between event camera bits per pixel encoding and a number of events per frame in accordance with some implementations. In some implementations, a tradeoff between the bits per pixel encoding and a number of events per frame for packet readout can be evaluated or balanced for the event camera. In some implementations, the higher bit per pixel encoding (e.g., the 11 bit per pixel encoding) is efficient for events occupancy below a threshold and the lower bit per pixel encoding (e.g., 2 bit per pixel encoding) is more efficient above the threshold. In some implementations, the threshold is set based on the encoding bits size, the pixels array sizes, the readout circuit, the event camera output circuitry, or the like. In some implementations, the 11 bit per pixel encoding is efficient for events occupancy below 20% (e.g., less than 20% of the pixels generate an event for each frame), and the 2 bit per pixel encoding is used for events occupancy above 20% (e.g., see FIG. 4). In some implementations, using two or more thresholds enables a bit per pixel encoding to variably use three or more different encodings (e.g., different bits or data per pixel).

In various implementations, event camera sensors are enabled to determine whether incoming data is dense or sparse (e.g., relative to a preset threshold). In some implementations, a event camera includes a control signal that indicates whether an incoming frame of data is sparse or dense before the start of readout for the event camera. In some implementations, an event camera includes control logic or control circuitry configured to determine whether an incoming frame of data is sparse or dense before the start of readout for the event camera. In some implementations, the control signal or the control logic drives a decision of the event camera to transmit the information packets with higher bit encoding (e.g., polarity, X coordinate; 11 bpp) or lower bit encoding (e.g., positive, negative or no event; 2 bpp). In some implementations, the control signal or the control logic is able to detect sparse events or dense events on a frame by frame basis, row by row basis, or based on any subset of the event camera pixel array.

Figure 5:
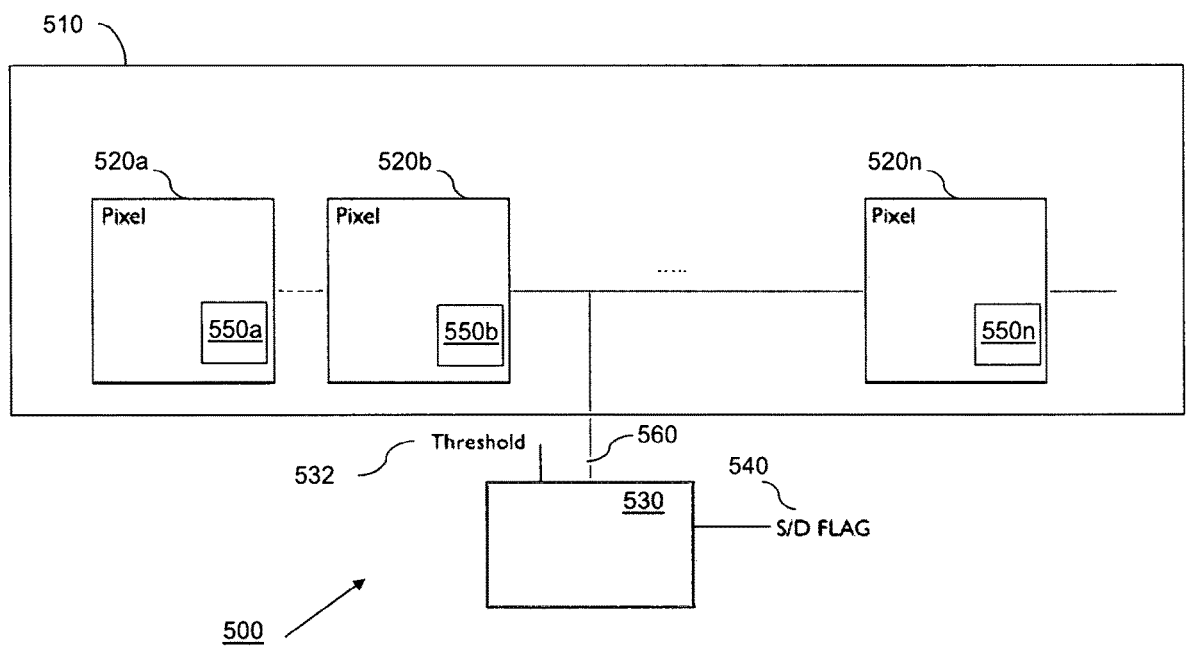
FIG. 5 is a block diagram showing an example detection of a sparse/dense condition for an event camera in accordance with some implementations.

FIG. 5 is a block diagram showing an example detection of a sparse/dense condition for an event camera in accordance with some implementations. As shown in FIG. 5, an event camera 500 includes a pixel array 510 including a plurality of pixels 520a, 520b, . . . , 520n. In some implementations, each of plurality of pixels 520a, 520b, . . . , 520n includes a detector 550a, 550b, . . . , 550n that can be enabled when an event is present in the corresponding pixel. In some implementations, one detector is used for two or more pixels (e.g., detector 550a is used with pixels 520a and 520b). The detections for each pixel in a frame, a row, or a readout region are then compared to a reference to determine the value of a sparse/dense control signal (S/D FLAG) 540 for the frame, the row, or the readout region. As shown in FIG. 5, the detections from the detectors 550a, 550b, . . . , 550n for each pixel in the frame, the row, or the readout region are combined as input 560 and compared by event density detector 530 to a threshold 532 to determine sparse/dense control signal (S/D FLAG) 540.

Figure 6:
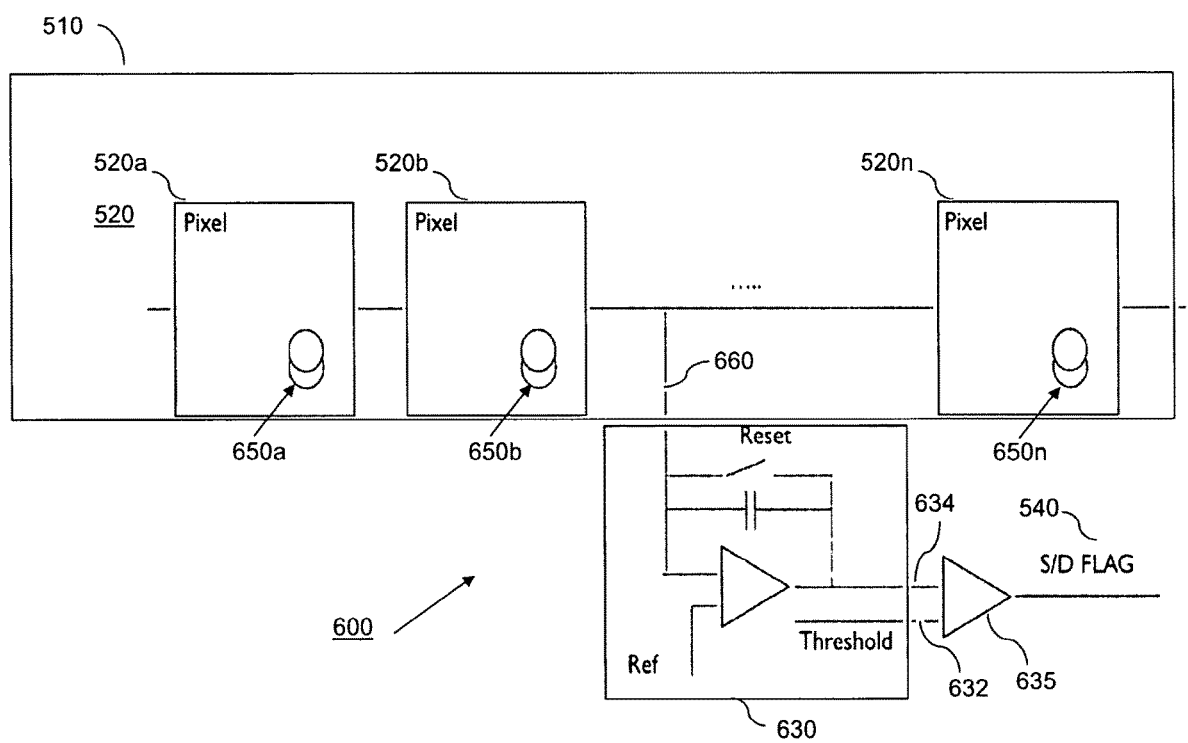
FIG. 6 is a block diagram showing another example detection of a sparse/dense condition for an event camera in accordance with some implementations.

FIG. 6 is a block diagram showing another example detection of a sparse/dense condition for an event camera in accordance with some implementations. As shown in FIG. 6, an event camera 600 includes the pixel array 510 including the plurality of pixels 520a, 520b, . . . , 520n with a current source 650a, 650b, . . . , 650n that can be enabled when an event is present in the corresponding pixel. In some implementations, one current source is used for two or more pixels (e.g., current source 650a is used with pixels 520a-520d). The currents for pixels in a frame, a row, or a readout region are combined as input 660 to a current integrator 630. In some implementations, the current integrator 630 is reset and then integrates the input currents 660 for a determined amount of time. In some implementations, the current integrator 630 outputs a voltage 634 proportional to the incoming currents, which can be compared to a voltage threshold 632 in a comparator 635 to determine the sparse/dense control signal (S/D FLAG) 540 for the frame, the row, or the readout region. In some implementations, the event density detector 630 is a current comparator.

Figure 7:
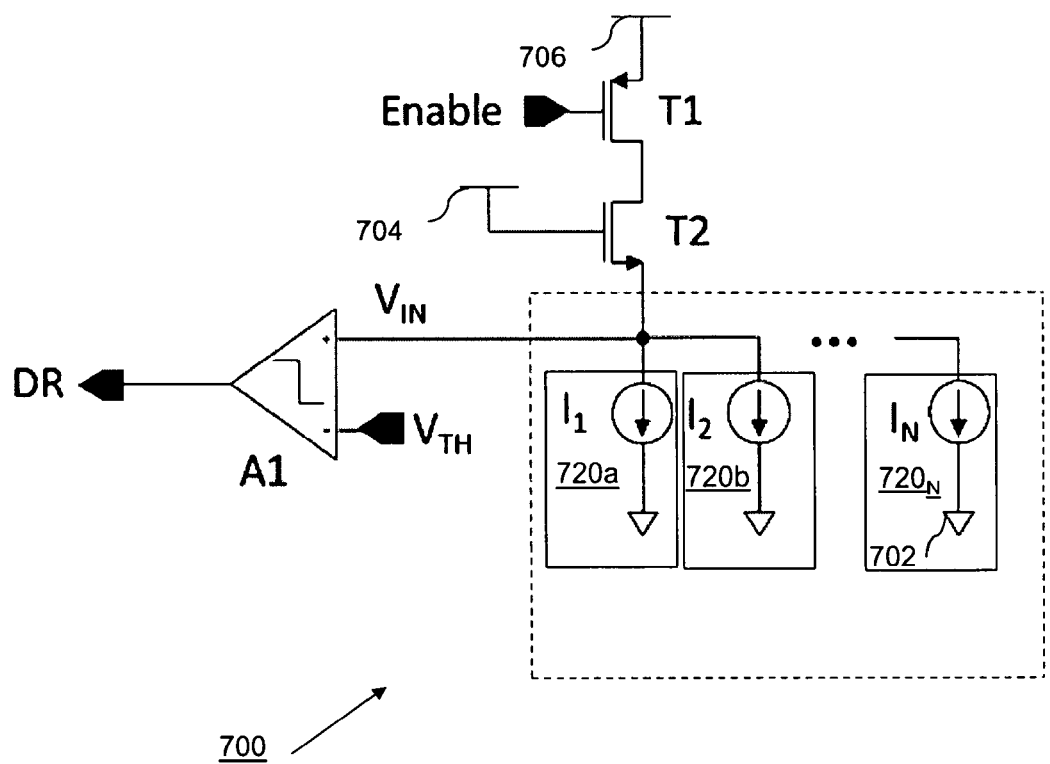
FIG. 7 is a block diagram showing an example detection of a sparse/dense row condition for an event camera in accordance with some implementations.

FIG. 7 is a block diagram showing an example detection of a sparse/dense row condition for an event camera in accordance with some implementations. As shown in FIG. 7, an event camera 700 includes a row of pixels 720a, 720b, . . . , 720$_N$ of an event camera 2D pixel array where current sources $I_1, I_2, \ldots I_N$ are placed one per pixel in the row. In some implementations, each current source $I_1, I_2, \ldots I_N$ is a single transistor switch.

As shown in FIG. 7, the transistor T2 (e.g., a source follower transistor) includes a second electrode (e.g., drain) electrode coupled to a second electrode of transistor T1, a first electrode (e.g., source) coupled to the current sources pixel memory output or Vin input of the comparator A1, and a gate coupled to a second reference voltage 704 (e.g., supply voltage or higher voltage). As shown in FIG. 7, the transistor T1 has a first electrode coupled to a third reference voltage 706, and a gate coupled to receive a control signal to enable (or disable) the current sources $I_1, I_2, \ldots I_N$ of the row of pixels 720a, 720b, . . . , 720$_N$. In some implementations, second reference voltage 704 is less than the third second reference voltage 706.

In some implementations, when any particular pixel 720a, 720b, . . . , 720$_N$ has an event, the corresponding current sources $I_1, I_2, \ldots I_N$ (e.g., single transistor switch) turns on and current flows through the corresponding current sources $I_1, I_2, \ldots I_N$ (e.g., single transistor switch). As shown in FIG. 7, more events in the row of pixels 720a, 720b, . . . , 720$_N$ creates more load for transistor T2, and the $V_{IN}$ potential goes down with an increase in the number of events in the row of pixels 720a, 720b, . . . , 720$_N$. The comparator A1 flips when the $V_{IN}$ potential reaches a threshold voltage $V_{TH}$ to generate or enable a dense row flag DR. The threshold voltage $V_{TH}$ is set for the comparator A1 to flip when the number of events in a row of the event camera 700 reaches an arbitrary critical number. In some implementations, the arbitrary critical number is a 10%, 20%, 30%, 40% occupancy level in the row of pixels 720a, 720b, . . . , 720$_N$. In some implementations, each current source $I_1, I_2, \ldots I_N$ is a single transistor switch with a first electrode coupled to a ground reference voltage, a gate coupled to a pixel memory output or a comparator in the pixel, and a second electrode coupled to the Vin input to the comparator A1. In some implementations, one current source is used for two or more pixels (e.g., current source $I_2$ is used with pixels 720a and 720b).

Figure 8:
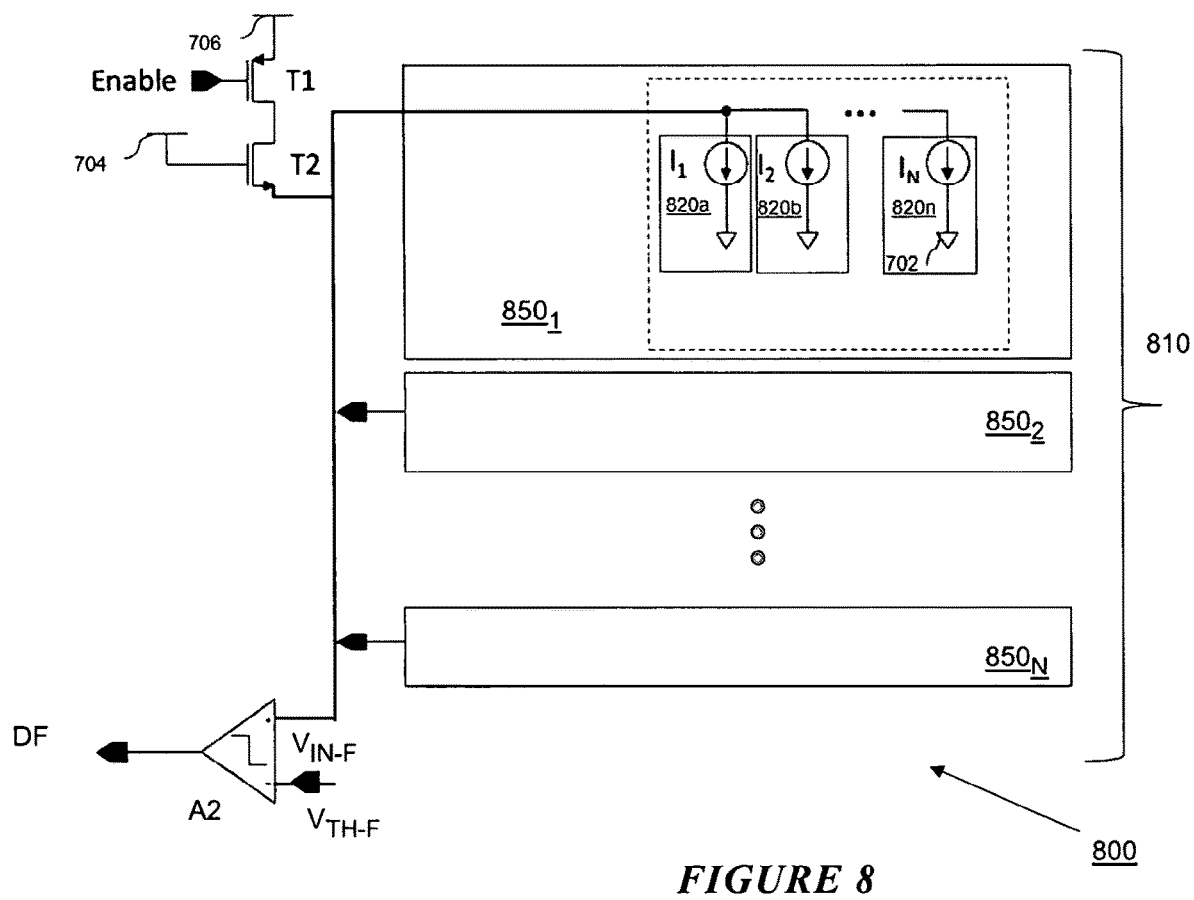
FIG. 8 is a block diagram showing an example detection of a sparse/dense frame condition for an event camera in accordance with some implementations.

FIG. 8 is a block diagram showing an example detection of a sparse/dense frame condition for an event camera in accordance with some implementations. As shown in FIG. 8, an event camera 800 includes a pixel array 810 including a plurality of rows 850$_1$, 850$_2$, . . . , 850$_N$, of pixels 820a, 820b, . . . , 820n of an event camera 2D pixel array where current sources $I_1, I_2, \ldots I_N$ that can be enabled when an event is present in the corresponding pixel are placed one per pixel in each of the rows 850$_1$, 850$_2$, . . . , 850$_N$. In some implementations, each current source $I_1, I_2, \ldots I_N$ is a single transistor switch. In some implementations, increasing a number of events in the pixel array 810 turns on corresponding current sources $I_1, I_2, \ldots I_N$ in corresponding pixels in the plurality of rows 850$_1$, 850$_2$, . . . , 850$_N$. The sum of all enabled currents $I_n$ flows through the common gate configured load transistor T2 and is converted into voltage $V_{IN-F}$. Comparator A2 flips when the $V_{IN-F}$ potential falls below a threshold voltage $V_{TH-F}$ to generate or enable a dense frame flag DF. In some implementations, the threshold voltage $V_{TH-F}$ is reached when 10%, 20%, 30%, 40% of the pixels in the pixel array 810 have events. As shown in FIG. 8, the gate of the transistor T1 is coupled to receive a control signal to enable (or disable) frame event density detection (e.g., by the current sources $I_1, I_2, \ldots I_N$) of the pixel array 810 before readout of the frame is performed by the event camera 800 in accordance with some implementations.

Although FIGS. 7-8 illustrate example analog circuits, other methods or implementations, e.g., for a row-wise/frame-wise readout mode, may use digital circuits. In some implementations, event presence bits can be summed (e.g., before being transmitted off-chip) and compared to a digital threshold to determine sparse/dense condition (e.g., DR, DF) for any subset of the event camera pixel array.

In some implementations, a system includes a matrix arrangement of a plurality of rows of pixels, an event density detector, and a readout circuit. Each of the pixels includes a photodetector, and an event detector coupled to the photodetector, the event detector configured to detect an event based on detecting a change in light intensity exceeding a change threshold in light received at the photodetector. In some implementations, each pixel is a dynamic vision sensor that detects events based on temporal contrast changes in the light received by each pixel. In some implementations, the event density detector is configured to determine event density of events detected at a subset of pixels of the matrix arrangement based on inputs received from the subset of pixels and a density threshold. For example, each event detector provides a signal to the event density detector that determines whether the combination of those signals exceeds the density threshold, e.g., more than 20% of pixels in a row, frame, or other subset of pixels that have received an event after the last readout. Then, the readout circuit is configured to determine a readout mode (e.g., low-density or high-density) based on the event density detector and to readout event data based on the readout mode. In one example for a low-density event mode, the event data for each pixel at which a pixel event occurs (e.g., 11 bits per pixel) is sent and includes only the polarity and X coordinate (e.g., but not the Y coordinate that is known from the row number). In another example for a high-density event mode, the event data for each pixel (e.g., 2 bits per pixel) is sent regardless of whether an event occurred at the pixel or not, and the event data includes only positive event, negative event, or no event since the X and Y coordinates are known based on data being sequential and the fact that data is sent for every pixel. In some implementations, the readout circuit may read/send a block of pixel data at a time (e.g., one row at a time) and because the row is known (e.g., from a row number encoded in the row header) or one time stamp is used for the frame, the event data transmitted for each pixel at which an event occurs can be smaller than the event data for each pixel otherwise would have been.

In some implementations, temporal contrast change of a physical environment captured by an event camera generates a corresponding stream of events. In some implementations, smaller pixels for an event camera pixel array result in larger pixel arrays and therefore an increased number of events. In some implementations, an event camera pixel array with smaller pixels uses synchronous readout. In some implementations, synchronous readout for an event camera pixel array occurs row by row. In some implementations, smaller pixels for an event camera pixel array generates timing or handshaking synchronization to preserve accurate readout of events. In some implementations, to improve accuracy of event detection and output, synchronous readout speed is increased, and an event camera output link has to be in synchronized with the increased readout speed (e.g., fast row readout).

However, the event camera output link (e.g., 980 PHY) is a significant source of power consumption. In some implementations, the event camera output link is a low power display port, camera communication link, or the like. In some implementations, the event camera output link power consumption creates a dilemma in how to transmit (e.g., how to pack and send data out) through the output link (e.g., event camera interface) with reduced or minimum power consumption.

In some implementations, sparse events are accumulated or stored (e.g., memory) in an event camera device before the data from the sparse events fills reaches a given size or certain level. In some implementations, sparse events from synchronous readout are accumulated or stored in a memory (e.g., memory buffer 960) in an event camera device until a burst of sparse events data (e.g., temporarily stored in memory buffer 960) is transmitted. In some implementations, synchronous sparse event pixel encoding (e.g., sparse event data) includes coordinate and polarity of an event with a time stamp corresponding to each row (e.g., fine time stamp 992). In some implementations, the accumulation of sparse event data in synchronous readout of an event camera pixel array allows the event camera output link (e.g., sensor link) to be disabled between the burst of sparse events data, which reduces power consumption of the event camera.

In some implementations, dense events or a high density event frame has to be transmitted (e.g., infrequently) as a raw raster image (e.g., with 2 bpp encoding 942) bypassing events accumulation (e.g., the memory buffer 960) of the event camera. In some implementations, high density event row encoding includes 2 bit per pixel raw data with y coordinate (e.g., row number) attached. In some implementations, the sparse events frame readout or the high density events frame readout (e.g., dense row, frame, or subset of pixel array) is determined in advance before the event camera pixel array readout occurs. In some implementations, the sparse events frame readout or the high density events frame readout is determined based on a number of events (e.g., events density or percentage occupancy) in a synchronous frame of data (e.g., see at least FIG. 4) A dense frame signal (e.g., 954) or a dense row signal (e.g., 952) may be generated in digital domain or analog domain (see FIGS. 5-8).

Figure 9:
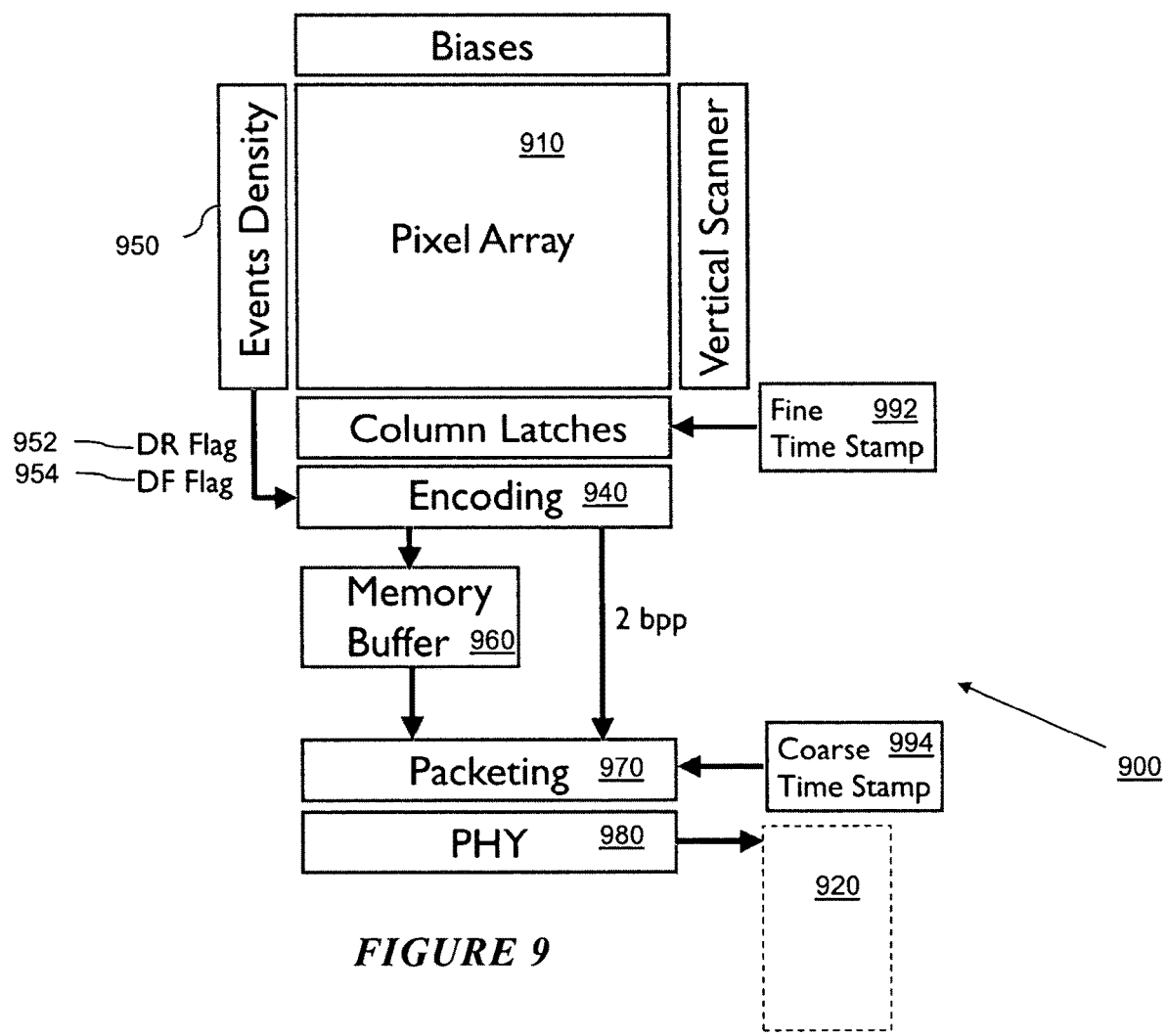
FIG. 9 is a diagram showing an example event camera using a low power synchronous readout in accordance with some implementations.

FIG. 9 is a diagram showing an example event camera architecture using synchronous readout in accordance with some implementations. As shown in FIG. 9, an event camera architecture 900 uses low power synchronous readout. In some implementations, the event camera architecture 900 includes a memory buffer 960. In some implementations, during a first synchronous (e.g., sparse event) readout mode, events detected by a pixel array 910 are accumulated in the memory buffer 960. In some implementations, during a first synchronous (e.g., sparse event) readout mode, events detected by a pixel array 910 are encoded by encoding layer 940 and transmitted to the memory buffer 960 for temporary storage. In some implementations, the first synchronous readout mode uses a polarity bit and a X coordinate (e.g., 11 bits) to encode event data attached to the row (e.g., Y coordinate). In some implementations, the memory buffer 960 stores a super frame of data. In some implementations, a super frame of data is not transmitted as often as a single frame of data (e.g., all pixels of the pixel array 910) so that the output link 980 can be turned off to save power consumption while the super frame is being accumulated in the memory buffer 960. In some implementations, the super frame of data can store events from a plurality of synchronous frames of data (e.g., sparse event data) output from the pixel array 910. In some implementations, the super frame of data can store events (e.g., sparse events) from more than 10 synchronous frames, more than 20 synchronous frames, more than 100 synchronous frames output by the pixel array 910. In some implementations, a number of sparse event frames of data stored by a super frame of data in the memory buffer 960 is based on an event density of the sparse event frames.

In some implementations, frames captured by the pixel array 910 have a lot of events (e.g., caused by light intensity change, moving scenes, flickering, or other causes). In some implementations, during a second synchronous (e.g., dense event, raw raster image, 2 bpp) readout mode, events detected by a pixel array 910 are transmitted directly to a packeting layer 970. In some implementations, during the second synchronous (e.g., dense event) readout mode, events detected by a pixel array 910 are encoded by the encoding layer 940 and transmitted to the packeting layer 970. In some implementations, the second synchronous readout mode is used for a high density event frame (e.g., greater than 20% occupancy) captured by the pixel array 910. In some implementations, the second synchronous readout mode uses 2 bit per pixel raw data. In some implementations, the second synchronous readout mode uses positive event, negative event, or no event as the 2 bits per pixel encoding.

In some implementations, determination of the first synchronous readout mode or the second synchronous readout mode is made before the frame of data is readout from the pixel array 910. In some implementations, determination of the first synchronous readout mode or the second synchronous readout mode is made based on the events occupancy of the frame (e.g., or part of a frame) captured by the pixel array 910. In some implementations, determination of the first synchronous readout mode or the second synchronous readout mode is made based on a dense row (DR) signal 952 or a dense frame (DF) signal 954 output by an event density detector 950 (e.g., see FIGS. 4-8). In some implementations, the second synchronous readout mode is used only when the dense frame (DF) signal 954 is enabled. In some implementations, the encoding layer 940 encodes and transmits the event data to the memory buffer 960 in the first readout mode and encodes and transmits the event data directly to the packeting layer 970 in the second readout mode is made based on the DR signal 952 or the DF signal 954.

In some implementations, the packeting layer 970 encapsulates the data output by the memory buffer 960 (e.g., super frame) or the encoding layer 940 (encoding) with additional information for a receiving device 920 (e.g., dense or sparse synchronous data). In some implementations, the packeting layer 970 encapsulates the data output by the memory buffer 960 or the encoding layer with a frame header. In some implementations, the device 920 is an electronic device such as the controller 100 or the electronic device 120 of FIGS. 1-3.

In some implementations, a fine time stamp 992 is assigned each time a sparse event is output by the pixel array 910. In some implementations, the fine time stamp 992 is assigned based on row number each time an event is output by the pixel array 910 in the synchronous readout modes. In some implementations, the fine time stamp 992 is 16 bits, 18 bits, or 24 bits.

In some implementations, a coarse time stamp 994 is output to the packeting layer 970 for each frame of data. In some implementations, the coarse time stamp 994 is assigned each time frame is output by the pixel array 910 in the second synchronous readout mode. In some implementations, the coarse time stamp 994 is 5 bits or 6 bits.

Various implementations disclosed herein include devices, systems, and methods that temporarily store sparse event data before transmission to an output link and directly transmit dense event data to the output link during readout of a frame (or part of the frame). In some implementations, sparse event data for a plurality of frames of the event camera are stored before transmission to the output link. For example, event data from 40 frames of the event camera may be stored before being transmitted together in a single transmission occurrence. In some implementations, a system includes a matrix arrangement of pixels, where each of the pixels is configured to detect an event based on detecting a change in light intensity exceeding a threshold in light received at a photodetector. In some implementations, an event buffer is configured to accumulate event data from the pixels at the matrix arrangement for events occurring based on accumulation criteria, and a transmission circuit is configured to readout event data from the event buffer and transmit the event data. In some implementations, the transmission circuit includes the output link that is disabled between transmissions. In some implementations, the transmission circuit may readout or send event data based on how full the event buffer is from accumulated event data. In some implementations, the transmission circuit bypasses the event buffer based on events occurring at the matrix arrangement of pixels satisfying event density criteria. In some implementations, the transmission circuit decides to use or bypass the event buffer before the frame is read out by the event camera. In some implementations, the event camera uses one or more synchronous readout modes. In some implementations, the transmission circuit is configured to readout event data from the matrix arrangement of pixels in a first readout mode and configured to readout event data from the event buffer in a second readout mode.

Figure 10:
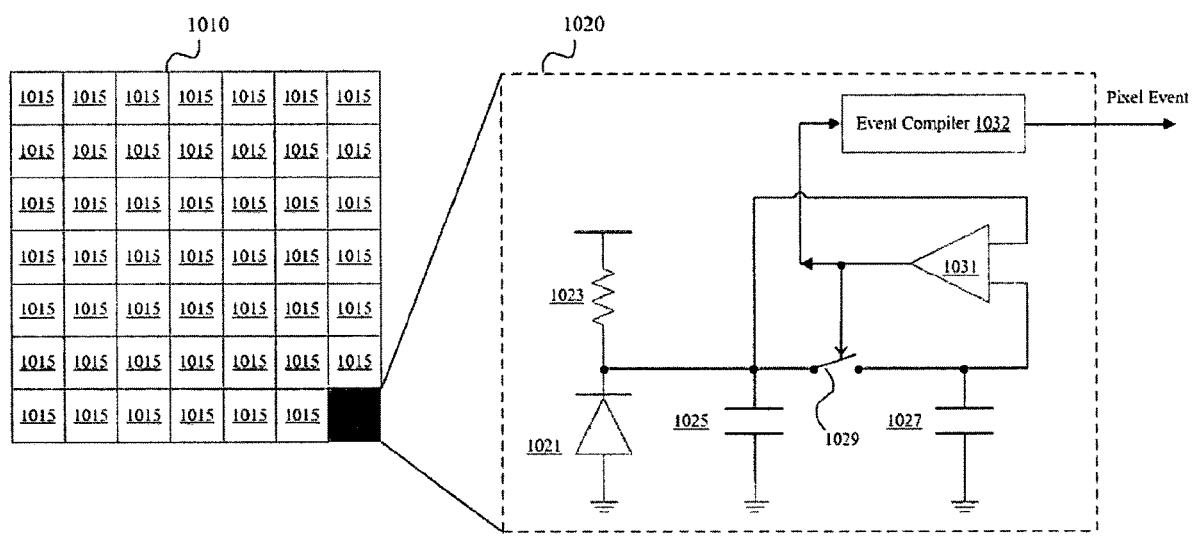
FIG. 10 is a block diagram of pixel sensors for an event camera and an example circuit diagram of a pixel sensor, in accordance with some implementations.

FIG. 10 is a block diagram of pixel sensors for an example event camera or dynamic vision sensor (DVS) and an example circuit diagram of a pixel sensor, in accordance with some implementations. As illustrated by FIG. 10, pixel sensors 1015 may disposed on an event camera at known locations relative to an electronic device (e.g., the electronic device 120 of FIG. 1) by arranging the pixel sensors 1015 in a 2D matrix 1010 of rows and columns. In the example of FIG. 10, each of the pixel sensors 1015 is associated with an address identifier defined by one row value and one column value.

FIG. 10 also shows an example circuit diagram of a circuit 1020 that is suitable for implementing a pixel sensor 1015. In the example of FIG. 10, circuit 1020 includes photodiode 1021, resistor 1023, capacitor 1025, capacitor 1027, switch 1029, comparator 1031, and event compiler 1032. In operation, a voltage develops across photodiode 1021 that is proportional to an intensity of light incident on the pixel sensor. Capacitor 1025 is in parallel with photodiode 1021, and consequently a voltage across capacitor 1025 is the same as the voltage across photodiode 1021.

In circuit 1020, switch 1029 intervenes between capacitor 1025 and capacitor 1027. Therefore, when switch 1029 is in a closed position, a voltage across capacitor 1027 is the same as the voltage across capacitor 1025 and photodiode 1021. When switch 1029 is in an open position, a voltage across capacitor 1027 is fixed at a previous voltage across capacitor 1027 when switch 1029 was last in a closed position. Comparator 1031 receives and compares the voltages across capacitor 1025 and capacitor 1027 on an input side. If a difference between the voltage across capacitor 1025 and the voltage across capacitor 1027 exceeds a threshold amount ("a comparator threshold"), an electrical response (e.g., a voltage) indicative of the intensity of light incident on the pixel sensor is present on an output side of comparator 1031. Otherwise, no electrical response is present on the output side of comparator 1031.

When an electrical response is present on an output side of comparator 1031, switch 1029 transitions to a closed position and event compiler 1032 receives the electrical response. Upon receiving an electrical response, event compiler 1032 generates a pixel event and populates the pixel event with information indicative of the electrical response (e.g., a value or polarity of the electrical response). In one implementation, event compiler 1032 also populates the pixel event with one or more of: timestamp information corresponding to a point in time at which the pixel event was generated and an address identifier corresponding to the particular pixel sensor that generated the pixel event.

An event camera generally includes a plurality of pixel sensors like pixel sensor 1015 that each output a pixel event in response to detecting changes in light intensity that exceed a comparative threshold. When aggregated, the pixel events output by the plurality of pixel sensor form a stream of pixel events that are output by the event camera. In some implementations, light intensity data obtained from the stream of pixel events output by an event camera is used to implement various applications.

Numerous specific details are set forth herein to provide a thorough understanding of the subject matter. However, those skilled in the art will understand that the subject matter may be practiced without these specific details. In other instances, methods apparatuses, or systems that would be known by one of ordinary skill have not been described in detail so as not to obscure subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting. As used in the description of the implementations, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A system comprising:
    a matrix arrangement of a plurality of rows of pixels, each of the pixels comprising:

a photodetector; and an event detector coupled to the photodetector, the event detector configured to detect an event based on detecting a change in light intensity exceeding a change threshold in light received at the photodetector;

an event density detector configured to determine event density of events detected at a subset of pixels of the matrix arrangement based on inputs received from the subset of pixels; and a readout circuit configured to determine differing readout modes based on the event density of events and to readout event data based on the differing readout modes, wherein the differing readout modes comprise a first readout mode configured to bypass an event buffer to readout first event data from the matrix arrangement of pixels when the event density corresponds to more than a threshold percentage of the subset of pixels detecting events and a second readout mode configured to readout second event data representing accumulated events from the event buffer when the event density corresponds to less than the threshold percentage of the subset of pixels detecting events.

2. The system of claim 1, wherein each pixel is a dynamic vision sensor that detects events based on temporal contrast changes in the light received at said each pixel.

3. The system of claim 1, wherein the density determination is made in advance of the readout circuit reading out the event data based on the differing readout modes.

4. The system of claim 1, wherein the differing readout modes of the readout circuit include a synchronous readout mode.

5. The system of claim 1, the event density detector comprises analog circuits or digital circuits.

6. The system of claim 1, wherein the event density detector comprises:
a plurality of density detectors, each density detector coupled to one or more pixels of the subset of pixels; and
a comparator coupled to the plurality of density detectors to receive a combined input from the plurality of density detectors, wherein the comparator is configured to compare the combined input from the plurality of detectors to the density threshold.

7. The system of claim 1, wherein the event density detector comprises:
a plurality of first density detectors, each first density detector coupled to one or more pixels of the subset of pixels; and
a plurality of row comparators, each row comparator coupled to a subset of the of first density detectors coupled to a row of pixels of the subset of pixels to receive a combined input from the subset of the first density detectors coupled to one row of pixels of the subset of pixels, wherein each of the row comparators is configured to compare the received combined input from the subset of the first density detectors coupled to said one row of pixels of the subset of pixels to a row density threshold to output a dense row signal for said one row;
a plurality of second density detectors, each second density detector coupled to receive one or more dense row signals of the plurality of row comparators; and
a frame comparator coupled to the plurality of second density detectors to receive a combined input from the plurality of second density detectors, wherein the frame comparator is configured to compare the combined input from the plurality of second density detectors to a frame density threshold.

8. The system of claim 1, wherein the event density detector comprises:
a plurality of current sources, each current source coupled to one pixel of the subset of pixels; and
a current comparator coupled to the plurality of current sources to compare a combined input from the plurality of current sources to the density threshold.

9. The system of claim 1, wherein the density threshold comprises a voltage value or a current value.

10. The system of claim 1, wherein the event density detector outputs a dense row signal or a dense frame signal.

11. The system of claim 1, wherein the density threshold is more than 10%, 20%, or 30% of pixels in the subset of pixels have received an event since an immediately preceding readout of the pixels in the subset of pixels.

12. The system of claim 1, wherein the subset of pixels comprises a row of pixels, a plurality of rows of pixels, a frame, a portion of a plurality of rows of pixels, or other subset of pixels.

13. The system of claim 1, wherein the event density of events is a measure of pixels in the matrix arrangement of the plurality of rows of pixels that detected an event since an immediately preceding readout of the matrix arrangement of the plurality of rows of pixels.

14. The system of claim 1, wherein the differing readout modes comprise a third readout mode that reads out first event data for each pixel in the subset of pixels and a fourth readout mode that reads out a second different event data for at least one pixel in the subset of pixels.

15. The system of claim 14, wherein the readout circuit in the third readout mode reads the first pixel data from a row at a time of the subset of pixels to reduce an amount of event data for each pixel of the subset of pixels, and wherein the first event data comprises whether an event occurred or did not occur at each pixel in the row of pixels.

16. The system of claim 14, wherein the readout circuit in the third readout mode sequentially reads and acquires the first pixel data from said each pixel in the subset of pixels, and wherein the first pixel data includes 2 bits per pixel indicating positive event data, negative event data, or no event data.

17. The system of claim 14, wherein the readout circuit in the fourth readout mode reads the second pixel data from a row at a time of the subset of pixels to reduce an amount of event data for each pixel of the subset of pixels, and wherein the second event data comprises a polarity of a pixel event and an X coordinate.

18. A method comprising:
at an electronic device having a processor:
providing a matrix arrangement of a plurality of rows of pixels, wherein each of the pixels comprises:
a photodetector; and
an event detector coupled to the photodetector, the event detector configured to detect an event based on detecting a change in light intensity exceeding a change threshold in light received at the photodetector;
determining event density of events detected at a subset of pixels of the matrix arrangement based on inputs received from the subset of pixels;
determining a differing readout modes based on the event density of the events detected; and
reading out event data of the subset of pixels of the matrix arrangement based on the differing readout modes, wherein the differing readout modes comprise a first readout mode configured to bypass an event buffer to readout first event data from the matrix arrangement of pixels when the event density corresponds to more than a threshold percentage of the subset of pixels detecting events and a second readout mode configured to readout second event data representing accumulated events from the event buffer when the event density corresponds to less than the threshold percentage of the subset of pixels detecting events.

19. A non-transitory computer-readable storage medium, storing program instructions computer-executable on a computer to perform operations comprising:

at an electronic device having a processor:

providing a matrix arrangement of a plurality of rows of pixels, wherein each of the pixels comprises:

a photodetector; and an event detector coupled to the photodetector, the event detector configured to detect an event based on detecting a change in light intensity exceeding a change threshold in light received at the photodetector;

determining event density of events detected at a subset of pixels of the matrix arrangement based on inputs received from the subset of pixels;

determining a differing readout modes based on the event density of the events detected; and reading out event data of the subset of pixels of the matrix arrangement based on the differing readout modes, wherein the differing readout modes comprise a first readout mode configured to bypass an event buffer to readout first event data from the matrix arrangement of pixels when the event density corresponds to more than a threshold percentage of the subset of pixels detecting events and a second readout mode configured to readout second event data representing accumulated events from the event buffer when the event density corresponds to less than the threshold percentage of the subset of pixels detecting events.

* * * * *

UNITED STATES PATENT AND TRADEMARK OFFICE
CERTIFICATE OF CORRECTION

PATENT NO. : 12,273,635 B2
APPLICATION NO. : 17/774727
DATED : April 8, 2025
INVENTOR(S) : Nikolai E. Bock, Emanuele Mandelli and Gennady A. Manokhin Page 1 of 1

It is certified that error appears in the above-identified patent and that said Letters Patent is hereby corrected as shown below:

In the Claims

Claim 7, Column 15, Line 52 reads:
"...coupled to a subset of the of first density detectors..."
Should read:
--...coupled to a subset of the first density detectors...--

Claim 18, Column 16, Line 64 reads:
"...determining a differing readout modes based on the..."
Should read:
--...determining differing readout modes based on the...--

Claim 19, Column 18, Line 7 reads:
"...determining a differing readout modes based on the..."
Should read:
--...determining differing readout modes based on the...--

Signed and Sealed this
Sixth Day of May, 2025

Coke Morgan Stewart
*Acting Director of the United States Patent and Trademark Office*